Feb. 12, 1957 M. N. FAIRBANK 2,780,974
PHOTOGRAPHIC APPARATUS
Filed Jan. 9, 1953 2 Sheets-Sheet 1
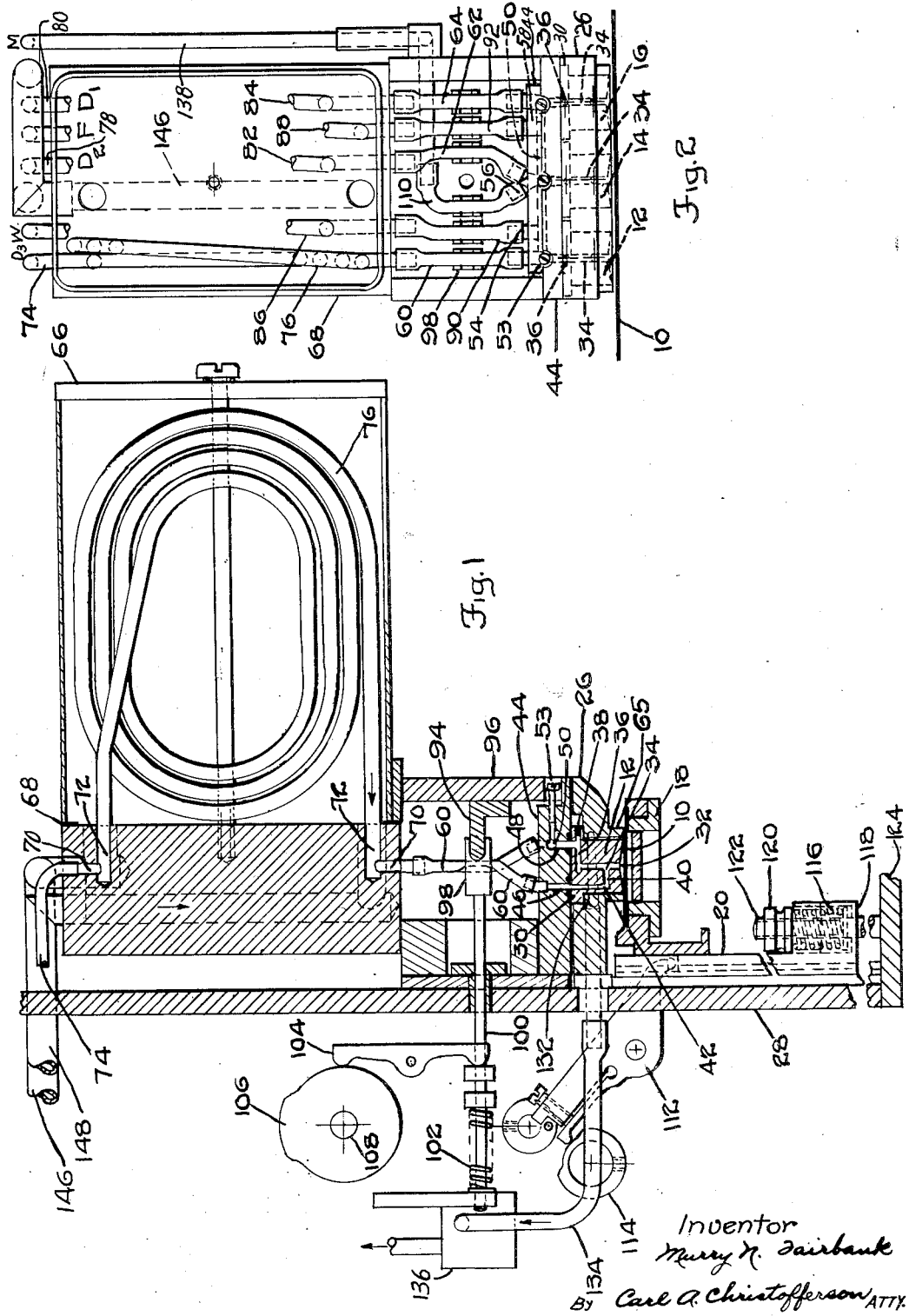
Inventor
Murry N. Fairbank
By Carl A. Christofferson ATTY.

Feb. 12, 1957  M. N. FAIRBANK  2,780,974
PHOTOGRAPHIC APPARATUS
Filed Jan. 9, 1953  2 Sheets-Sheet 2
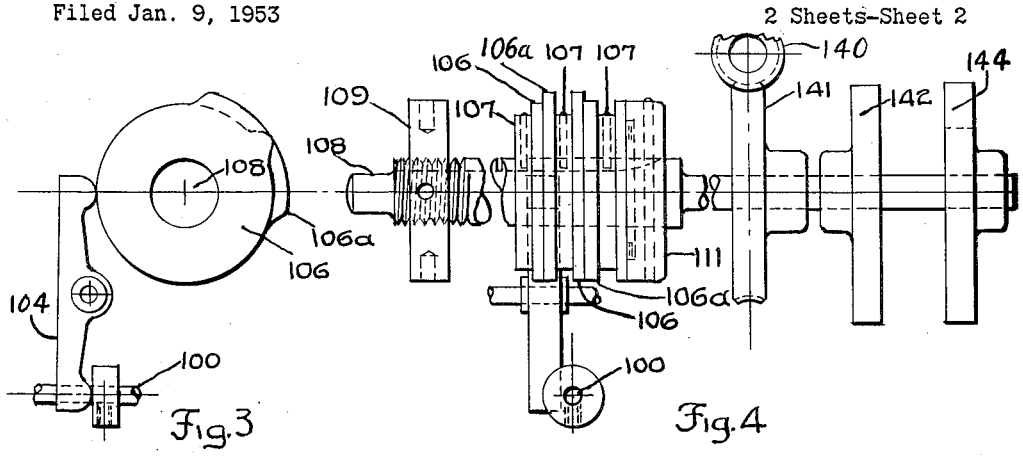
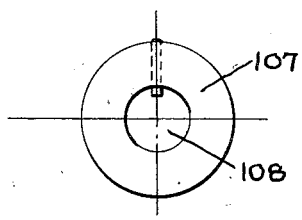
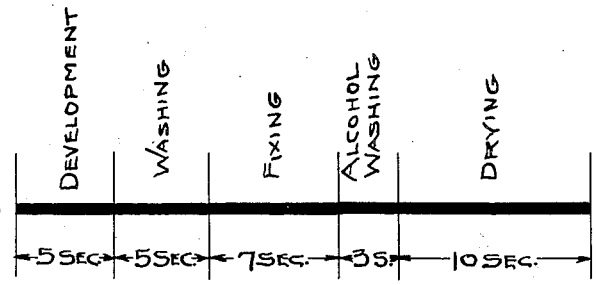
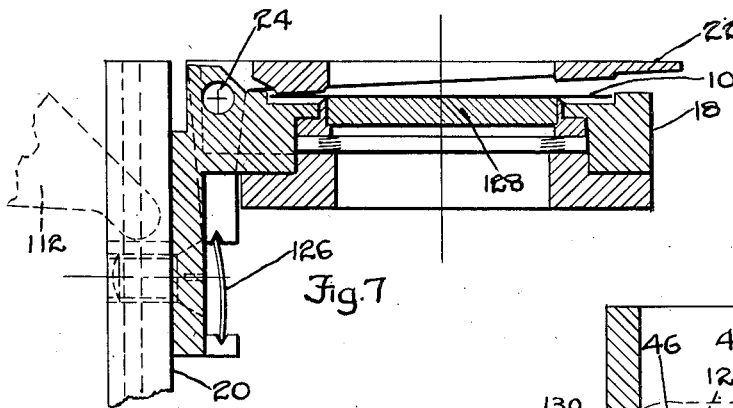
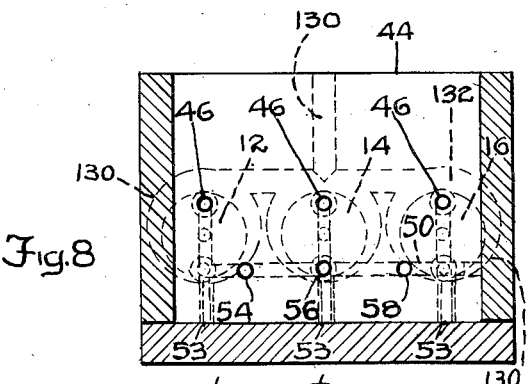
Inventor
Murry N. Fairbank
By Carl A. Christofferson ATTY.

United States Patent Office 2,780,974
Patented Feb. 12, 1957

2,780,974

PHOTOGRAPHIC APPARATUS

Murry N. Fairbank, Belmont, Mass., assignor to Polaroid Corporation, Cambridge, Mass., a corporation of Delaware Application January 9, 1953, Serial No. 330,463

7 Claims. (Cl. 95—89)

The present invention relates generally to apparatus for processing exposed photographic film and, as illustrated, relates more particularly to apparatus for simultaneously and rapidly processing a plurality of exposed areas of photographic film.

The present apparatus, illustrating a preferred embodiment of this invention, is designed for use with a camera and a projector for the preparation and projection of photomicrographs of pathological specimens as shown and described by Edwin H. Land et al. in "A Color Translating Ultraviolet Microscope" (Science, April 15, 1949, vol. 109, No. 2833, pp. 371–374).

The apparatus disclosed in the above-mentioned article is designed to be used in the diagnosis of specimens of suspected malignant growths. Thin specimens of such growths are placed on the slide of a microscope and ultraviolet light is projected through the specimen and three successive exposures under three different wavelengths of ultraviolet light are made on spaced areas of a photosensitive film. The exposed areas of film are then moved into position for development and fixing in the apparatus embodying the present invention. Since the specimens are often obtained during a surgical operation for removing the malignant growth, the present apparatus is designed to process the exposed film in a very short period of time to enable the pathologist to report to the surgeon as the operation progresses as to whether or not the specimen contains any malignant growth.

The present invention resides in a film processing unit arranged simultaneously to process spaced exposed areas of film in a relatively short time, for example, less than 30 seconds. The apparatus includes a plurality of processing cups which are arranged over the exposed film areas and receive processing solutions having predetermined concentrations, temperatures and time periods of application to insure that each area will be developed to the same extent. To this end the processing fluids are heated by passage through a suitable heat exchanger as they pass to the processing cups. The processing fluids comprise a developer, water, a fixer and a drying fluid such as methanol. These fluids are delivered successively to the processing cups for periods sufficient to properly develop and fix the image in each of the spaced exposed areas on the film.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Figure 1 is a vertical sectional view of one form of apparatus embodying the present invention;

Fig. 2 is a view in elevation, partly in section, of the apparatus shown in Fig. 1;

Fig. 3 is a view in side elevation of cam-operated devices for actuating valve mechanisms for permitting flow in proper sequence of the processing fluids necessary to develop and fix an image on exposed film;

Fig. 4 is a view in front elevation of a device shown in Fig. 3;

Fig. 5 is a detailed view of a spacing washer;

Fig. 6 is a timing diagram illustrating generally the time required for each of the processing operations;

Fig. 7 is a vertical sectional view of film-track releasing mechanism; and

Fig. 8 is a plan view of the processing cups.

In the illustrated embodiment of the invention, a film 10 having three successive latent images thereon is fed from the camera to the processing station with the emulsion face at the upper side thereof. The three image portions are intermittently fed into positions below processing cups 12, 14 and 16 by the use of any suitable film-advancing mechanism.

The film strip 10 is supported on a film track 18 mounted on a vertically movable slide 20 by mechanism which will later be described. The film track 18 is provided with a cover plate 22 which is movable about a pivot pin 24 for clamping the film strip 10 to the track 18 for purposes which will later become apparent.

Located above the track 18 there is provided means 26 for supporting the processing cups 12, 14 and 16. The supporting plate 26 is suitably secured to a vertical wall 28 and is provided with spaced openings for receiving the cups 12, 14 and 16.

The cups 12, 14 and 16 are substantially identical and hence it will be necessary only to describe one of these cups in detail. As shown most clearly in Figures 1 and 8, each cup is generally cylindrical in shape and is provided at its upper end portion with a radially extending flange 30 by means of which the cups are supported in suitable openings in the supporting plate 26. The lower face of each cup 12, 14 and 16 is slightly dished or concave to provide a suitable space or region 32 in which processing fluids are circulated. Each cup is provided with an axially extending bore 34 which terminates short of the upper end of each cup and communicates with the inner end of a horizontal bore 36 closed at its outer end by a suitable plug 38. Suitable means (not shown) are provided for orienting the cups with respect to plate 26. Each cup 12, 14 and 16 also is provided with a vertical bore 42 and a horizontal bore 40 communicating with central bore 34 just above the lower force of the cup.

Located above the supporting plate 26 is a plate 44 having vertical bores 46 and 48 aligned with and communicating with, respectively, bore 42 and an opening in the upper end of the cup communicating with bore 36. The bores 48 are connected by a horizontal bore 50 which in turn is connected by suitable tubes 54, 56, 58 (Fig. 8) for supplying in sequence water, a fixer and a drying fluid to each of chambers 32. The three bores or passages 46 are connected by suitable tubes 60, 62 and 64 to a supply of developer.

Supporting plate 26 is provided with generally cylindrical lips 65 encompassing each of cups 12, 14 and 16, the latter defining in conjunction wtih lips 65 annular spaces or regions between said cups and said lips. During processing of the film, these annular spaces are connected to suitable suction means (later to be described) for introducing processing fluids into and removing processing fluids from space 32 and for maintaining the photographic film in abutment against lips 65. In order to insure that maximum use is made of the developer and the other processing fluids during their passage through the processing cups, means are provided for creating turbulence in a processing fluid within space 32. For creating such turbulence, suitable air bleed valves 53 are provided which permit air to be drawn into the cups 12, 14 and 16 as the processing operation proceeds. This turbulence brings the maximum amount of processing fluid into contact with the emulsion on photographic film 10. This air bleed further flushes bores 34 and 36 after each processing step. As illustrated, the air bleed valves 53 are mounted in suitable horizontal bores each communicating with one of the vertical bores 48 (Fig. 1) in the plate 44. Valves 53 are adjusted so as to admit or bleed air into the cups in quantities sufficient to effect the desired turbulence in or agitation of the processing liquid, but in quantities insufficient to increase the pressure within the cups to that of the surrounding atmosphere.

The present invention contemplates the use of processing liquids which are heated and maintained at a uniform temperature sufficiently high to permit the developing and fixing of a stable photographic image in a period of the order of 20 to 40 seconds. To this end, the apparatus is provided with a tank 66 formed of suitable noncorrosive metal, for example stainless steel, in which water or other suitable liquid is maintained at a predetermined suitable temperature. The tank 66 comprises a back wall 68 provided with a plurality of vertical and horizontal bores or passages 70 and 72 which serve to conduct processing fluids to suitable noncorrosive metal tubes located within the tank 66, and tubes 146 and 148 for circulating the heating liquid.

A suitable developer is fed from a suitable storage tank (not shown) through upper passages 70 and 72 into a suitable coiled, noncorrosive metallic tube 76 located within the tank 66, the lower end being connected to the tube 60 through communicating passages 70 and 72 formed in the lower portion of the back wall 68. The tubes 78 and 80 are likewise connected to the storage tank of developer and are likewise connected to the tubes 62 and 64 by coiled noncorrosive metallic tubes 82 and 84. Thus, the paths of the developer through the uniform temperature bath to processing chambers 32 are substantially identical, thereby providing uniform developing conditions at each image portion.

Water and fixer are supplied at the proper times to the processing cups through, respectively, coiled tubes 86 and 88 and connections and passages similar to the ones described above. A drying fluid such as methanol, is supplied at the proper time to the processing cup through tube 138.

In order to supply the processing fluids in proper sequence and for suitable processing periods, suitable mechanism is provided. As illustrated, tubes 60, 62 and 64 for conducting developer and similar tubes 90, 92 and 110 for conducting, respectively, water, fixer and drying fluid are provided. Located forwardly of these tubes, which are formed of suitable flexible material, is a ledge 94 fixed to a vertical member 96 located between the plate 44 and the tank 66. Each of the tubes 60, 62, 64, 90, 92 and 110 is enclosed within the fork-shaped forward end 98 of a cam-operated slide member 100 which is normally maintained in tube-pinching or closing position by a suitable coiled spring 102. The slide 100 is moved rearwardly to move the fork 98 out of tube-pinching position by a cam lever 104 operated by a suitable cam 106 fixed to a cam shaft 108. As illustrated in Fig. 4, six cams 106 are mounted on the cam shaft 108, these cams being positioned to operate simultaneously to open the tubes 60, 62 and 64 to permit introduction of developing fluid into the processing cups 12, 14 and 16, respectively. Another of the cams 106 is so positioned that when the developing period is completed and slides 100 controlling the closing of tubes 60, 62 and 64 are moved forwardly to pinch these tubes against the ledge 94, the slide 100 associated with the tube 90 will be moved rearwardly to open the tube and permit water to be supplied to the processing cups to remove excess developing fluid. In a like manner the tubes 92 and 110 are opened and closed in sequence. Each cam 106 includes a second disk 106a, the two disks comprising cam 106 being rotatable with respect to one another about shaft 108 to permit variation in the duration of the period during which the cams act to hold their respective slide members 100 and fork-shaped ends 98 out of tube-pinching position. Cams 106 are spaced apart on shaft 108 by such means as spacing washers 107 and are retained on shaft 108 by a lock nut 109. As a means for driving cam shaft 108, there are provided a worm 140 connected to suitable drive means and a gear 141 secured to shaft 108 and meshed with worm 140. Suitable cams for controlling the cycle of the device are indicated at 142 and 144 mounted on shaft 108.

In order to hold the film strip 10 in proper position, as hereinbefore described, the film track 18 is provided. This track is actuated by suitable cam mechanism for raising and lowering the track to permit the film to be advanced when necessary without danger of scratching or otherwise marring the film. To this end, there is provided a cam lever 112 operated at suitable timed intervals by a cam 114 to depress the slide 20 to permit free passage of the film strip 10 below the processing cups. The slide 20 is returned to upper position by suitable compression springs 116 located within suitable bosses 118 formed in the lower end of the slide 20. Upward movement of the slide 20 is limited by nuts 120 threaded to the upper ends of rods 122 extending through bars 118 and fixed to the base 124 of the apparatus. When the slide 20 is lowered by the above-described mechanism, the cover plate 22 is caused to swing about its pivot 24 by a leaf spring 126.

After the film strip 10 has been fed into position and the slide 20 returned to its original position by the coiled springs 116, lips 65 engage the film strip and press it against a spring-supported plate 128 in the film track 18. Sufficient pressure is exerted on the film strip 10 by the film track to form a substantially air-tight seal between the film strip and lips 65. In order to remove spent or excess processing fluid, a vacuum means is provided, as best shown in Fig. 1, and includes a passage 130 (Fig. 8) communicating with a passage 132 opening into the cup-receiving recesses in the block 26. A tube 134 connects the passage 130 with a suitable vacuum pump 136. The pump 136 is continuously operated and hence is effective at all times to remove processing fluids.

The operation of the present device will now be summarized briefly with particular reference to Fig. 6. Although in Fig. 6 a time cycle of thirty seconds is indicated, it is evident that this time cycle may be increased or decreased as desired. After the film strip 10 has been advanced into processing position below cups 12, 14 and 16, it is clamped against lips 65 by track 18 which moves upwardly to the position shown in Fig. 1. Tubes 60, 62 and 64 are opened in order to permit the vacuum pump to draw suitably heated developer into processing cups 12, 14 and 16. By way of illustration, the path of the developer to processing chamber 32 is through tubes 76 and 60, thence through bores 46, 42, 40 and 34. Agitation of the developer within chamber 32 is caused by air bled through valves 53. After the developer has acted for five seconds, tubes 60, 62 and 64 are closed and tube 90 is opened in order to permit the vacuum pump to draw suitably heated water into processing cups 12, 14 and 16 and, thereby, to remove all traces of the developer. The path of the water to the processing chambers is through tubes 86 and 90, thence through bores 50, 48, 36 and 34. After the water has acted for five seconds, tube 90 is closed and tube 92 is opened in order to permit the vacuum pump to draw fixing solution into the processing chamber of processing cups 12, 14 and 16. The path of the fixing solution to the processing chambers is through tubes 88 and 92, thence through bores 50, 48, 36 and 34. After the fixing solution has acted seven seconds, tube 92 is closed and tube 110 is opened in order to permit the vacuum pump to draw a drying solution into the processing chambers of cups 12, 14 and 16. The path of the drying solution to the processing chambers is through tubes 138 and 110, thence through bores 50, 48, 36 and 34.

After the drying solution has acted for three seconds, tube 110 is closed and track 18 is moved downwardly to break contact between film strip 10 and the lips of cups 12, 14 and 16. The film strip now is dried by directing over it a blast of warm air from any convenient source (not shown).

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In an apparatus for processing exposed photographic film, the combination of means for supporting said film with its emulsion face up, cup means providing a recess and a peripheral lip surrounding said recess against which the emulsion face of said film is pressed, means, including a bore centrally located in said cup, for supplying a succession of heated processing liquids to said recess, suction means for removing said liquids successively from said recess as the film processing progresses, and inlet valve means communicating with the surrounding atmosphere for bleeding predetermined amounts of air through said bore into said recess for agitating the processing liquids in said recess and purging said bore and recess of each of said fluids as the flow of each fluid is stopped.

2. In an apparatus for processing exposed photographic film, the combination of means for supporting said film with its emulsion face up, cup means mounted above said film and having a recess in its lower portion and a peripheral lip surrounding said recess against which the emulsion face of the film is pressed, means, including a bore centrally located in said cup, for supplying a succession of heated processing liquids to said recess, suction means for removing said liquids successively from the periphery of said recess as the film processing progresses, and inlet valve means communicating with the surrounding atmosphere for bleeding predetermined amounts of air through said bore into said recess for agitating the processing liquids in said recess and for purging residual processing liquid from said bore before the introduction of each successive processing liquid into said recess.

3. In an apparatus for processing exposed photographic film, the combination of means for supporting a film strip having a plurality of spaced exposed areas thereon with its emulsion face up, a plurality of spaced cup means mounted above said film, each of said cup means having a recess in its lower face and a peripheral lip surrounding said recess, said support means holding the emulsion face of said film in contact with said peripheral lips, means, including a bore centrally located in each of said cup means, for supplying a succession of heated processing liquids to each of said recesses for developing and fixing the image in each of said exposed areas of said film strip, suction means for removing said liquids successively from the periphery of each of said recesses as the processing of each of said areas progresses, inlet valve means communicating with the surrounding atmosphere for bleeding predetermined amounts of air into said bores and said recesses to agitate the processing liquids in said recesses and to purge residual processing liquids from said bores and recesses before the introduction of each successive processing liqid through said bores into said recesses, and means for moving said supporting means and said film away from said recesses after the processing has been completed.

4. In an apparatus for processing a photographic film, the combination of means for supporting said film with its emulsion surface up, a generally cylindrical cup mounted above said film, said cup including a lower surface having a recess defining a first region adapted to contain a succession of processing liquids, said cup providing a cylindrical peripheral surface encompassing said recess, vent means in said cup communicating with said first region, means providing an annular lip against which said film is adapted to abut, said lip being contiguous with and spaced from said cylindrical peripheral surface, said lip defining in conjunction with said peripheral surface an annular region, tube means communicating with said vent means for conducting a succesion of processing liquids to said first region, suction means communicating with said annular region for causing said film to abut against said lip and for removing said succession of processing liquids from said first region, and air bleed means communicating with said vent means for admitting controlled amounts of air into said vent means to create turbulence in a liquid within said first region and to purge residual liquid from said vent means before the introduction of each successive processing liquid into said first region.

5. In an apparatus for processing a photographic film, the combination of a generally cylindrical cup, said cup providing a recessed surface bounding a processing region, said cup providing a cylindrical peripheral surface encompassing said recessed surface, a first vent means within said cup communicating with said processing region, second vent means within said vent cup communicating with said first vent means at a point in the cup contiguous within said processing region, an annular lip encompassing said peripheral surface in spaced relation therewith, said lip defining in conjunction with said peripheral surface an annular region, means supporting said film with its emulsion surface in contact with said lip, means communicating with said first vent means for conducting processing liquids to said processing region, means communicating with said second vent means for conducting a processing liquid to said processing region, suction means communicating with said annular region for causing said film to abut against said lip and for removing said succession of processing liquids from said processing region, and air bleed means communicating with said first vent means for admitting controlled amounts of air into said processing region for creating turbulence in a liquid within said processing region.

6. In an apparatus for processing a photographic film, the combination of means for supporting said film with its emulsion surface up, a generally cylindrical cup mounted above said film and providing a recessed surface bounding a processing region, said cup having a cylindrical peripheral surface encompassing said recessed surface, a first vent means within said cup communicating with said processing region, second vent means within said cup communicating with said first vent means at a point contiguous with said processing region, an annular lip encompassing said peripheral surface in spaced relation therewith, said lip defining in conjunction with said peripheral surface an annular region, said support means holding the emulsion surface of said film in contact with said lip, a plurality of resilient tubes communicating with said first vent means for conducting processing liquids to said processing region, a single resilient tube communicating with said second vent means for conducting a processing liquid to said processing region, a plurality of clamps associated with said tubes, said clamps normally being operative to prevent said tubes from conducting said processing liquids to said processing region, means for selectively rendering said clamps inoperative, suction means communicating with said annular region for causing said film to abut against said lip and for removing said succession of processing liquids from said processing region, and air bleed means communicating with said first vent means for admitting controlled amounts of air into the latter and said processing region for creating turbulence in a liquid within said processing region and for purging residual liquid from said first and second vent means before the introduction of each successive processing liquid into said processing region.

7. In an apparatus for processing a photographic film, the combination of means for supporting said film with its emulsion surface up, a cylindrical cup mounted above said film, said cup providing a recessed surface bounding a processing region and a cylindrical peripheral surface encompassing said recessed surface, a first bore within said cup communicating with said processing region and substantially perpendicular to said recessed surface, a second bore communicating with said first bore, and a third bore communicating with said first bore at a point contiguous with said processing region, an annular lip encompassing said peripheral surface in spaced relation therewith, said lip defining in conjunction with said peripheral surface an annular region, a first resilient tube communicating with said third bore for conducting a developing liquid to said processing region, a first clamp associated with said first tube, said first clamp being normally operative to prevent said first tube from conducting said developing liquid to said processing region, means for rendering said first clamp inoperative, a plurality of resilient second tubes communicating with said second bore for conducting a washing fluid, a fixing fluid, and a drying fluid to said processing region, a plurality of second clamps associated with said plurality of second tubes, said plurality of second clamps being normally operative to prevent said plurality of second tubes from conducting said washing fluid, said fixing fluid and said drying fluid to said processing region, means for selectively rendering said plurality of second clamps inoperative, suction means communicating with said annular region causing said film to abut against said lip and for removing said succession of processing liquids from said processing region, and air bleed means communicating with said second vent means for admitting controlled amounts of air into the latter and said processing region for creating turbulence in a liquid within said processing region and for purging residual liquid from said first, second and third vent means prior to the introduction of each successive processing liquid into said processing region.

References Cited in the file of this patent
UNITED STATES PATENTS

| | | |
|---|---|---|
| 2,446,668 | Tuttle et al. | Aug. 10, 1948 |
| 2,631,511 | Tuttle | Mar. 17, 1953 |

FOREIGN PATENTS

| | | |
|---|---|---|
| 123,229 | Germany | Oct. 1, 1901 |

OTHER REFERENCES

Katz et al.: J. M. P. T. E., vol. 60, February 1953, pages 105–129.

Tuttle et al.: 1952 Photographic Engineering, vol. 3, No. 2, pages 65–77.